Jan. 23, 1973   J. B. ALLEN ET AL   3,712,975
LINE SEGMENT INTERSECTION TEST
Filed June 21, 1971   5 Sheets-Sheet 1

INVENTORS
JOSEPH B. ALLEN
HENRY E. LIPPMANN

BY Douglas C. McKechnie

ATTORNEY

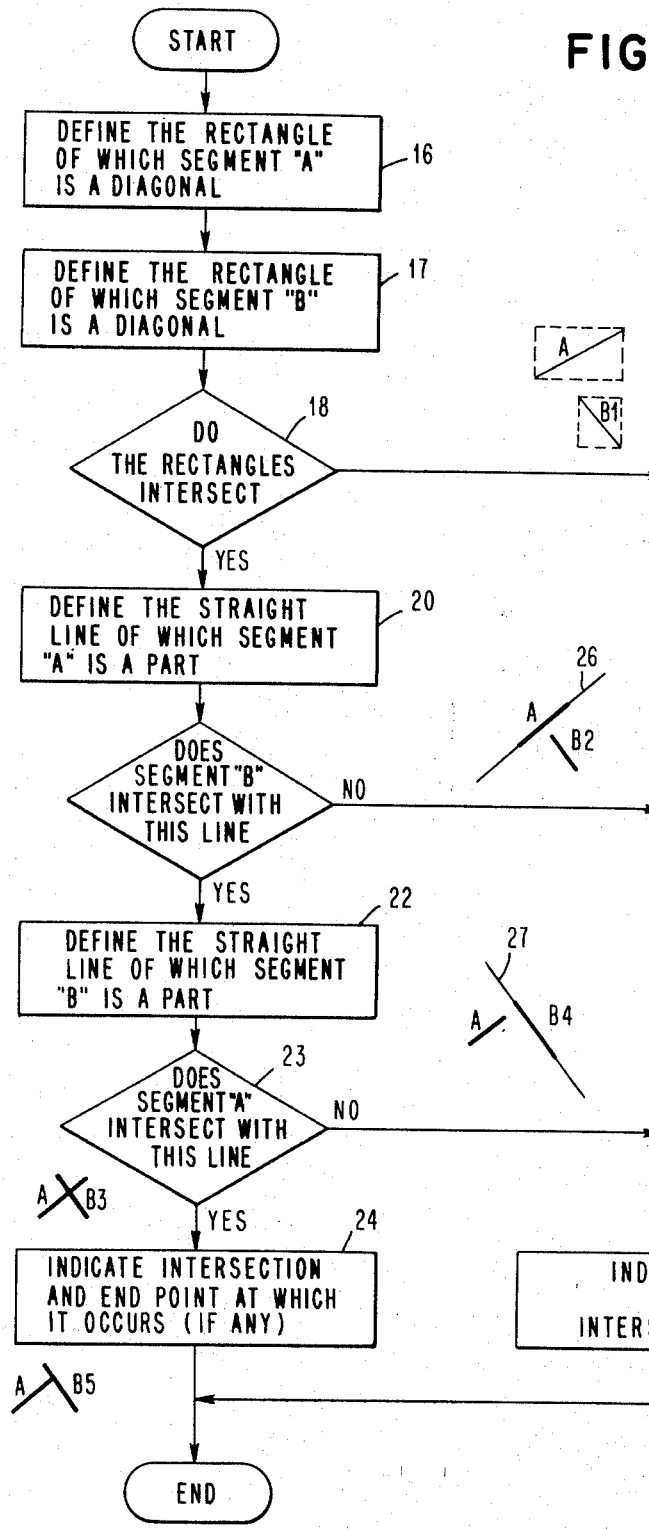

United States Patent Office 3,712,975
Patented Jan. 23, 1973

3,712,975
LINE SEGMENT INTERSECTION TEST
Joseph B. Allen, Poughkeepsie, and Henry E. Lippmann, Croton-on-Hudson, N.Y., assignors to International Business Machines Corporation, Armonk, N.Y.
Filed June 21, 1971, Ser. No. 155,095
Int. Cl. G06f 15/06, 15/56
U.S. Cl. 444—1      7 Claims

ABSTRACT OF THE DISCLOSURE

A method is performed in a data processing system to determine whether or not two straight line segments intersect and to identify the end points if intersection occurs at one of the end points of the line segments. Used in the process are electrical signals representing the Cartesian coordinates of the end points of the two segments being tested. High speed general purpose registers are set to represent the end points and thereafter, by means of high speed register-to-register operations, the following tests are performed. First, a test is made as to whether or not the rectangles of which the line segments form the diagonals intersect. If not, there is no segment intersection. If so, the test is inconclusive and represents only the possibility that the line segments may intersect. If the rectangles intersect, then one segment is extended to form a line and a test is made as to whether or not the other segment intersects this line. If not, there is no segment intersection. If so, then the test is still somewhat inconclusive so that a further test is made by considering the other segment as part of a line and then testing whether or not the first segment intersects this other line. If not, there is no segment intersection. If so, the conclusion is made that the two line segments do, in fact, intersect.

BACKGROUND OF THE INVENTION

Field of the invention

This invention relates to the field of data processing and more particularly, to a method capable of being performed in a data processing system to determine whether or not two line segments intersect.

Prior art

In the field of design automation, computers have been used to design the layout of printed circuit boards having a multiplicity of conductive paths thereon. A particular use within this area is the automatic checking of printed circuit boards for shorted (intersecting) wire segments. One way that this has been accomplished in the past is to define the end points of all the segments being checked. Then starting with one segment, it is tested against all the other segments on the board for intersection. Once this is completed, then the next wire segment is again tested against all remaining segments on the board. The process continues until all segments have been completely checked against each other. Where a printed circuit board has a large number of segments thereon, the process is particularly time consuming. In the past, this checking has been done by the solution of simultaneous equations. This process, when carried out in a computer, involves a large number of storage-to-storage operations which are relatively slow in comparison to other high speed logical and arithmetic operations that can be carried out using principally general purpose registers. The relatively slow speed of the storage-to-storage operations coupled with the generally long period of time required to test a printed circuit board having a multiplicity of segments thereon, is the problem which the present invention is designed to improve.

SUMMARY OF THE INVENTION

One of the objects of the invention is to provide a high speed method for the checking of printed circuit board wiring for intersecting or shorted wire segments.

Another object of the invention is to provide a method for checking intersection of wire segments on a printed circuit board in a situation where the ratio of the number of non-intersecting wire segments to the number of intersecting segments is extremely large.

Another object of the invention is to provide a test for determining the intersection of wire segments that includes a simple first part designed to quickly determine that a large number of the wire segments do not intersect and a second part which is slower and more complex than the first part, for specifically determining whether or not the line segments intersect in the event the first part is unable to conclude that the segments do not intersect.

Still another object of the invention is to provide a segment intersection test capable of being carried out in the high speed general purpose registers of a data processing system, using high speed arithmetic and logic operations relative thereto.

Briefly, in accordance with the invention, two line segments are tested for intersection by defining the end points of each segment. Next, the rectangles of which the segments are the diagonals, are defined and a test is made as to whether or not the rectangles intersect. If they do not, then the segments do not intersect. If they do, further tests are performed to resolve the issue of intersection. To do this, one segment is treated as part of a first line and a test is made as to whether or not this first line and the other segment intersect. If they do not, the conclusion is that the segments do not intersect. If they do, then a second test is made to consider the other segment as part of a second line in determining whether or not the first segment intersects this second line. If not, the segments do not intersect. If so, the segments do intersect.

DESCRIPTION OF THE DRAWINGS

The foregoing and other objects, features and advantages of the invention will be apparent from the following more particular description of the preferred embodiment of the invention, as illustrated in the accompanying drawings wherein:

FIG. 3 is a general flow diagram illustrating the general method of the invention.

GENERAL DESCRIPTION

Figure 1:
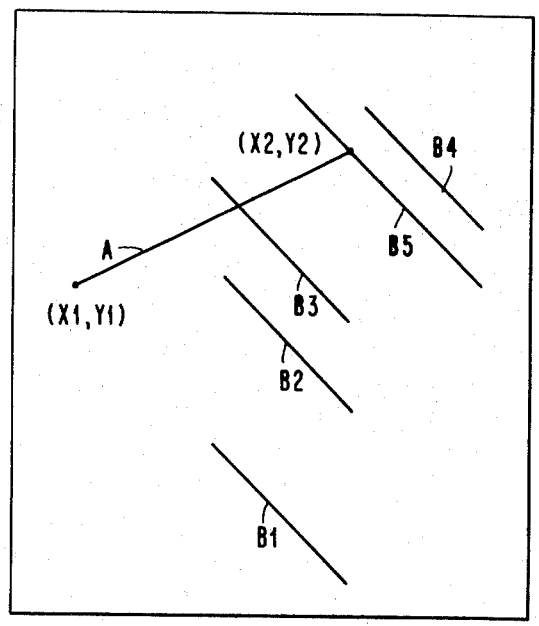
FIG. 1 is a diagram illustrating various line segments used as examples in describing the invention and facilitating an understanding thereof.

Referring now to the drawings, FIG. 1 shows a plurality of segments A and B1–B5 representing different exemplary of relationships that are treated differently in carrying out the method of the invention, in accordance with what tests are performed to determine the intersection or non-intersection. Relative to segment A, each segment is denfied by a pair of end points (X1, Y1 and X2, Y2) on at Cartesian plane. Tests will be made in the order of first determining whether segment B1 intersects segment A, then whether B2 intersects segment A, and so on. It is to be understood in connection with the automatic checking of a printed circuit board, that each segment would in turn be tested against all other segments on the board in connection with which it has not yet been tested for intersection. As previously indicated, the method of the invention is particularly applicable to a board layout where there are a large number of non-intersecting segments. It would thus be applicable to a layout where there are a large number of segments A/B1 combinations, a lesser number of A/B2 and B4 type combinations and a smaller number of A/B3 and B5 type combinations.

Figure 2:
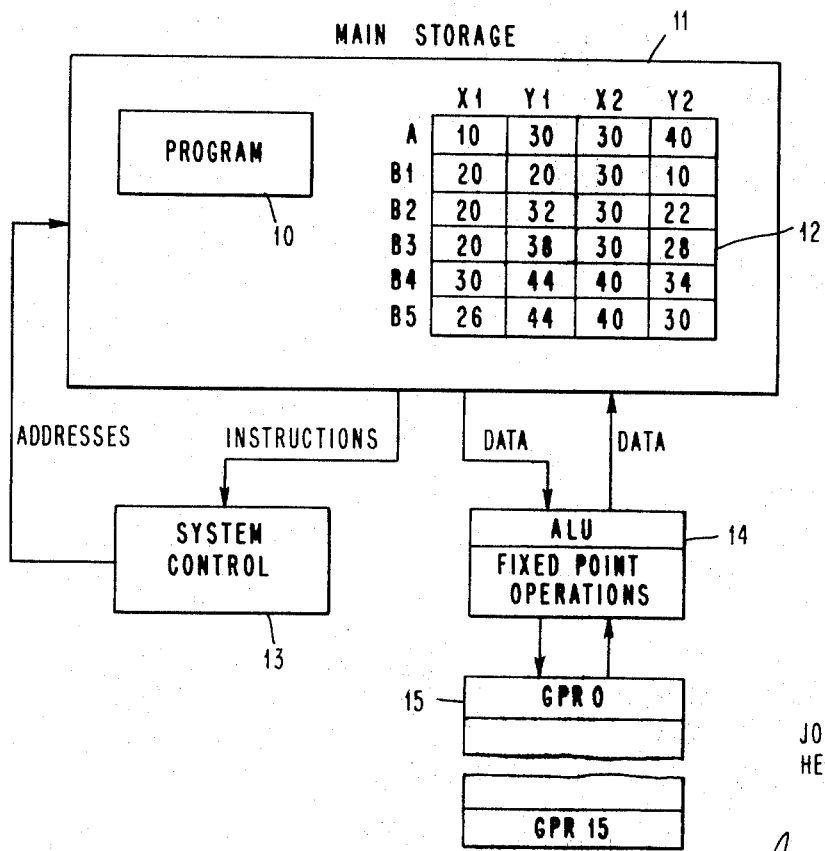
FIG. 2 is a general block diagram of a data processing system useful in understanding certain aspects of the invention.

As previously indicated, it is contemplated that the method of the invention be carried out in a data processing system. While the method is susceptible to being carried out by a special purpose hardware, it is preferable to use a general purpose computer and program it to carry out the details of the inventions through a series of coded instructions. Inasmuch as details of various data processing systems are widely known and inasmuch as it is within the skill of the art to provide the detailed coding of the program, these will not be described in any detail. However, for the purpose of understanding the invention, FIG. 2 shows part of the logical structure of the IBM System/360 which is widely known and used and therefore unnecessary to describe in detail. In accordance with the invention, it is contemplated that a program 10 be loaded into the main storage 11 of the system for execution, the program being associated with a data structure 12 that specifies the end points of the various lines for which the intersection tests are to be performed. Using the lines shown in FIG. 1 as the examples, FIG. 2 shows the decimal equivalent of the Cartesian coordinates of their end points. It is to be understood that within the system, these end points are represented by some form of binary signals, as is widely known, and that the method is carried out by the manipulation of these signals. However, for ease of understanding the invention, the description will proceed by discussing the information to be conveyed by the signals, as opposed to the signals themselves.

During the course of execution of program 10, the instructions are fed to system control 13 which provides addresses for accessing the required data and also causes data to be transferred to and from an arithmetic and logic unit 14. Associated with unit 14 are sixteen general purpose registers 15 used in connection therewith to perform the various arithmetic and logical operations using register-to-register instructions. At the start of the intersection test, the end point specification of line A is moved into certain of the general purpose registers 15 and the end points defining the segment, which line A is to be tested in connection with, are moved into other ones of these registers. Thereafter, the general method illustrated in FIG. 3 is performed.

Referring now to FIG. 3, superimposed thereon are illustrations of the various different types of segment relationships for which different tests indicate different conditions.

Step 16 defines the rectangle of which segment A is a diagonal. Step 17 then defines the rectangle of which segment B is a diagonal and a decision step 18 determines whether or not the thus defined rectangles intersect. If the rectangles do not intersect, then a branch is taken to a step 19 which indicates no intersection and that ends the test. For segments A and B1, step 18 would result in a negative decision. But for the remaining relationships, step 18 would result in positive determinations. The positive determination indicates that there is a possibility that the segments do intersect and the next series of steps 20–24 are designed to reduce this possibility to the positive determination of intersection or no intersection. Step 20 defines the straight line of which segment A is a part. Thereafter, step 21 decides whether or not segment B intersects with this line. If not, then a branch is taken to step 19. Within the examples, segment B2 does not intersect the line 26 of which segment A is a part. However, lines B3–B5 would.

When a positive determination is made from step 21, then step 22 proceeds further to define the straight line of which segment B is a part. Step 23 then decides whether or not segment A intersects with this line. If not, a branch is taken to step 19. In the example, segment A does not intersect the line 27 of which segment B4 is a part, and thus a branch would be taken to step 19. However, lines B3 and B5 would result in a positive determination from step 23. The positive determination from step 23 indicates that the segments do, in fact, intersect. Step 24 indicates the fact there is an intersection and it also indicates the end points at which intersection occurs, if any. Thus, in step 24 for the segments A and B3, step 24 would merely indicate the intersection for the segments A and B5, step 24 would indicate there was an intersection and also the end point X2, Y2 of segment A which is the end point at which intersection occurred.

DETAILED DESCRIPTION

Before proceeding with a detailed explanation of the logic of the flowchart, an explanation will be made of the symbology used therein. Rectangular shaped blocks are used to represent arithmetic, logic or data moving tape steps. Diamond shape blocks represent decisional steps. The circles are connectors used to connect various points of the flowchart. Within each circle is an alpha-numerical representation identifying the connectors and indicating where the various steps go to. Thus, the connector coming off of the positive determination from step 35, has "C1" indicated therein. "C" refers to FIG. 4C and the "1" is a numerical suffix differentiating other connectors on the same page. Referring to FIG. 4C, C1 is associated with step 19. The connector merely means that a positive determination from step 35 will branch to step 19. Other contors have similar meanings.

Figure 4A:
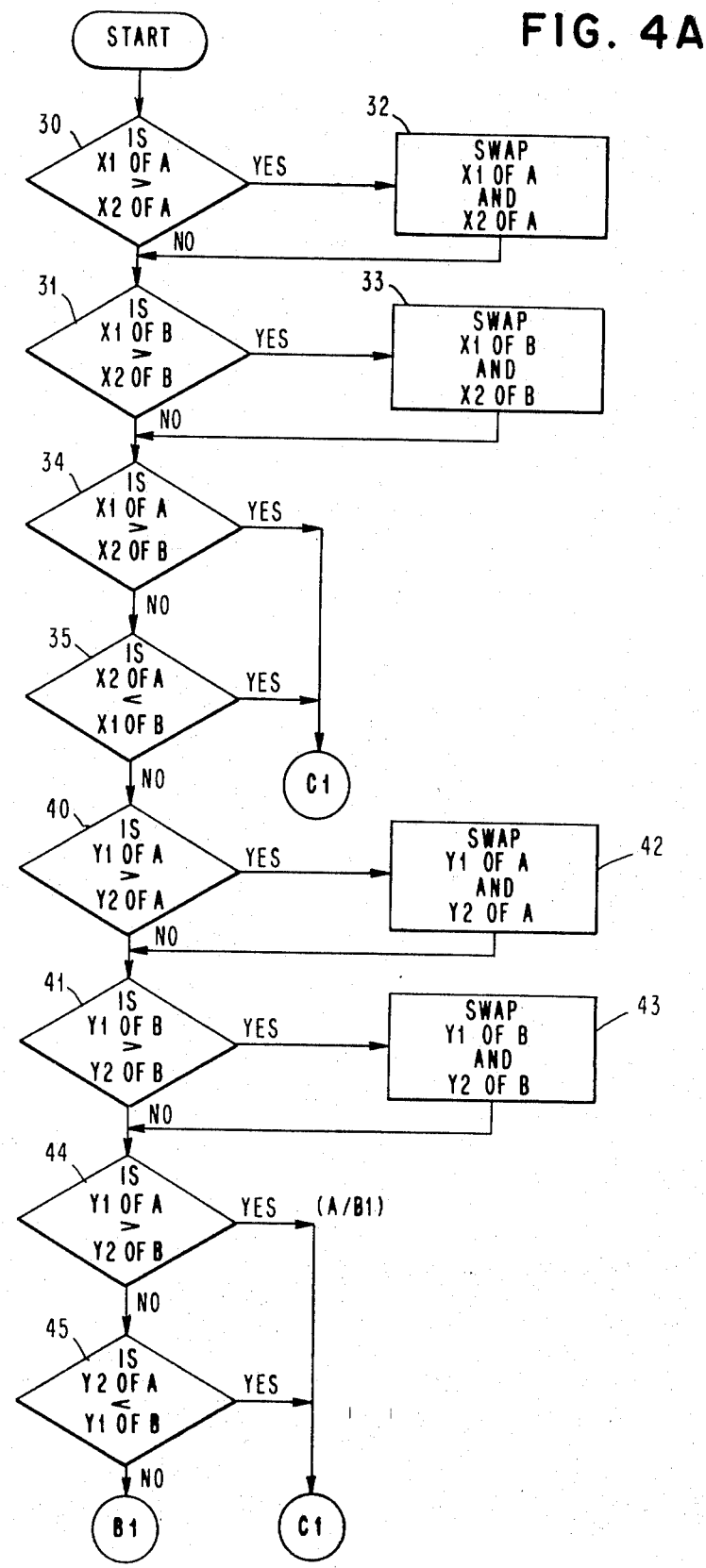
FIGS. 4A–4C form a detailed flow chart of the preferred embodiment of the invention.

Referring now to FIG. 4A, at the start of the method, a series of steps 30–33 are performed to define the rectangles of which segments A and B are the diagonals in terms of their maximum and minimum X coordinates. Step 30 decides whether the specified X1 of A is greater than the specified X2 coordinate of A. If not, which indicates that X1 is the minimum X coordinate of A, the process proceeds to step 31. If so, then X1 and X2 are swapped by step 32 so that on going into step 31 from either step 30 or 32, X1 represents the minimum X coordinate of the rectangle of which A is the diagonal. Steps 31 and 33 perform similar functions relative to the rectangle of which segment B is the diagonal. Thus, at the start of step 34, X1 is the minimum X coordinate of the rectangle of which segment A is the diagonal and X1 of B is the minimum X coordinate of which B is the diagonal.

Step 34 then determines whether the minimum X coordinate of the rectangle of which A is a diagonal is greater than the maximum X coordinate of the rectangle of which B is the diagonal. If it is, then segments A and B do not intersect and a branch is taken to step 19 (FIG. 4C). If it is not, then step 35 decides whether the maximum X coordinate associated with A is less than the minimum X coordinate of B. If so, the segments A and B do not intersect and a branch is taken to step 19. If not, the process proceeds along to step 40.

Steps 40–45 are similar to steps 30–35 and perform for the Y coordinates the same functions that were done relative to the X coordinates. FIG. 4A is self-explanatory in this regard and thus will not be described in detail. For the exemplary line or segment test, the test on segments A and B1 will result in a positive determination from step 44.

It will be seen as a result of the decisions made in the process described thus far, the results are either a positive determination that there is no segment intersection, and thus a branch will be taken to step 19 to so indicate the fact, or a negative determination is made by step 45. This negative determination means that there is a possibility that segments A and B do intersect which possibility is resolved in later steps. In the situation of checking a printed circuit board where there are a large number of wire segments represented by examples A/B1, the positive determination of no intersection is made simply and fast. Where such positive determination cannot be made, the remaining steps are more complicated and require longer periods of time to execute.

The theory behind the next series of steps is based upon the known mathematics that, given a line segment whose end points are represented by coordinates X1, Y1 and X2, Y2, the line of which the segment is a part can be represented by the following equation:

$$(Y-Y1)(X2-X1) = (X-X1)(Y2-Y1)$$

Figure 4B:
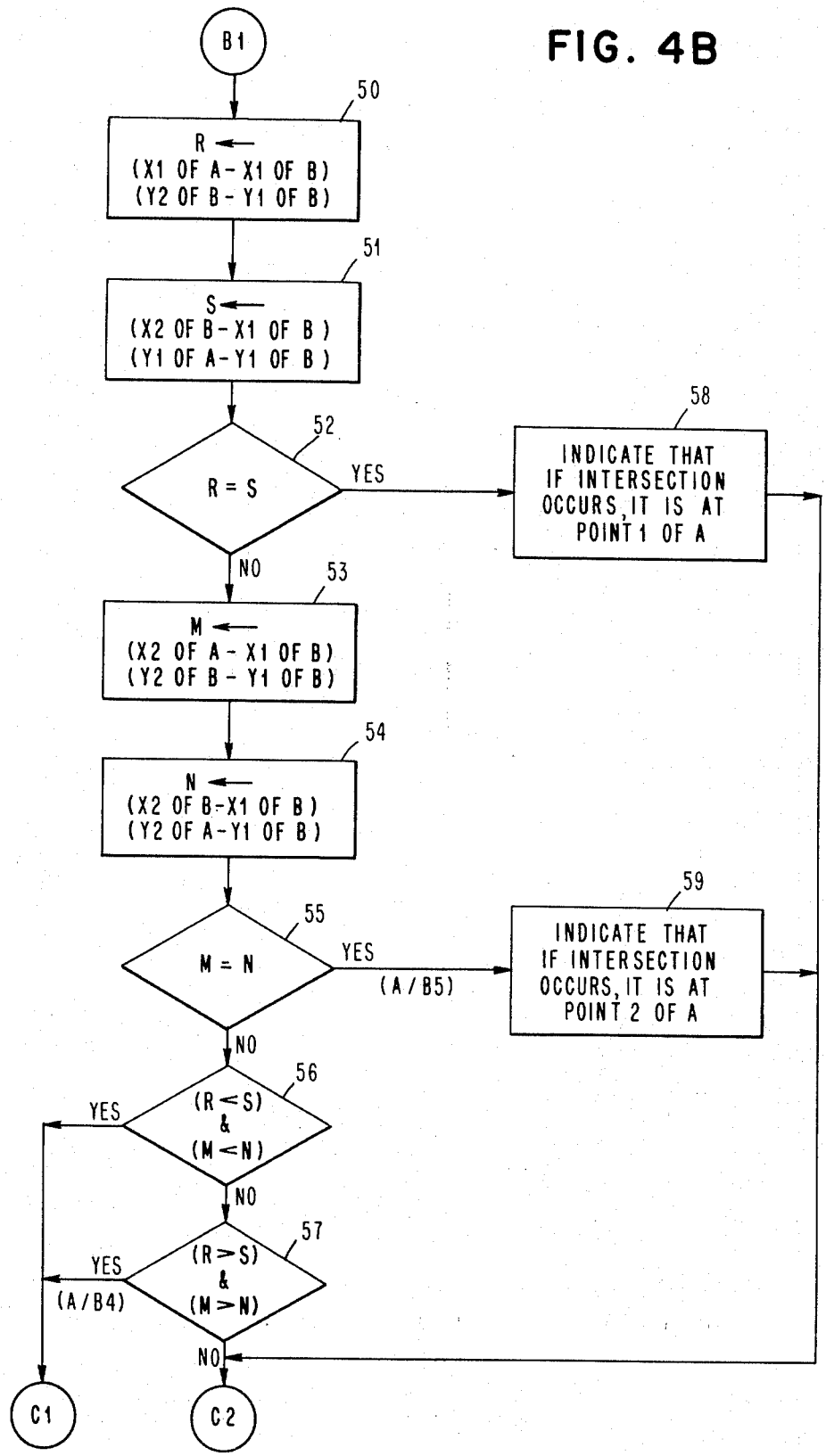
Figure 4C:
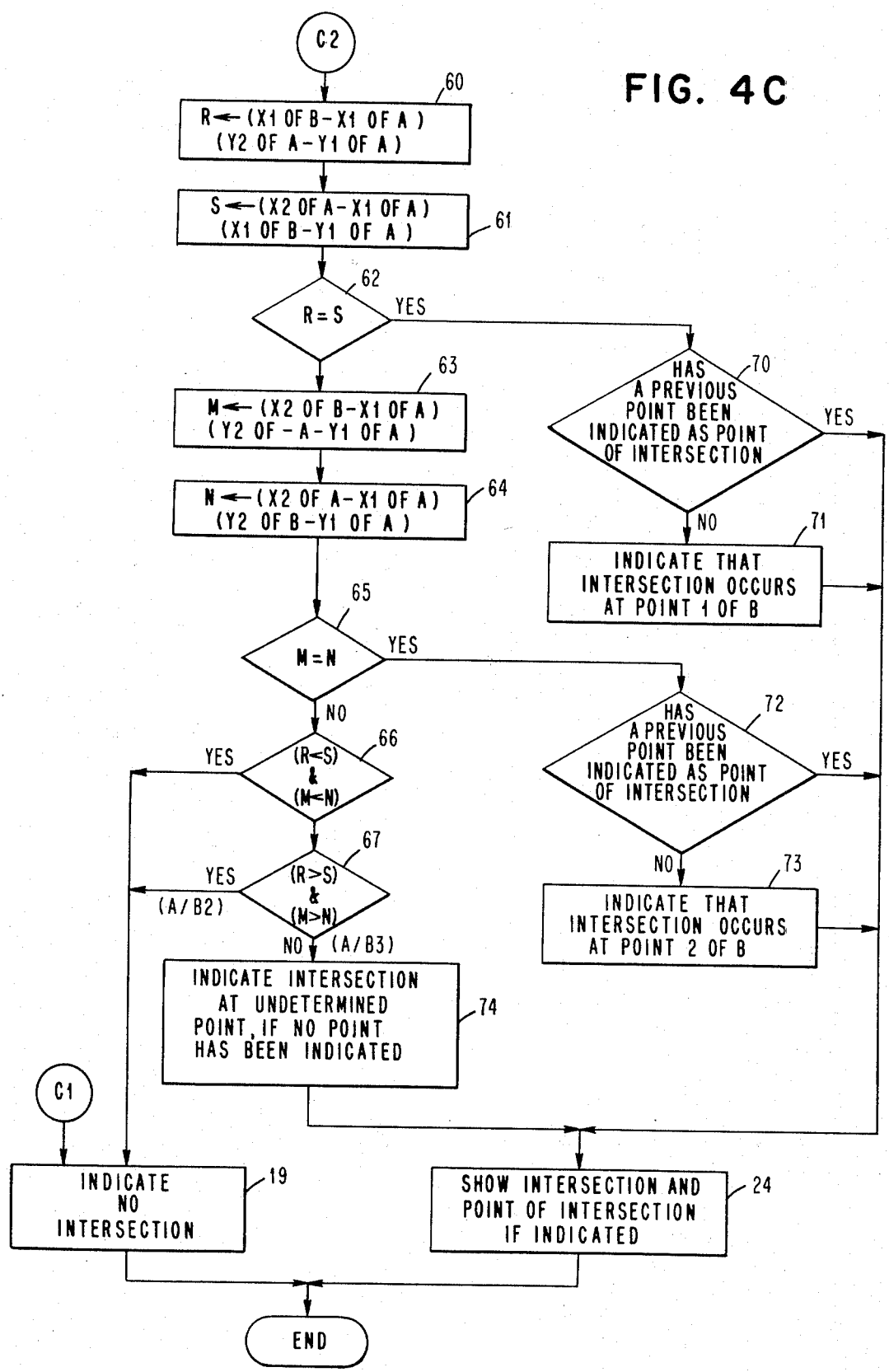

This formula can be used to determine whether a segment intersects the line of which the other segment is a part by noting where the end points of the segment lie relative to the line. If both end points are on one side or the other side of the line, there is no intersection. Otherwise, there is. The process of the invention is not dependent upon the order in which the segments are extended as lines. FIG. 3, in steps 20 and 22 defines the line in which segment A is a part first whereas in the following step illustrated in FIGS. 4B and 4C, the reverse order occurs and segment B is first extended to a line. In the following steps, the values R and M are concerned with the righthand side of the above equation and the values S and N are concerned with the lefthand side. Also, it should be noted that steps 50 and 51 define the line of which segment B is a part and also substitute into the definition the coordinates associated with he first end point of segment A. Steps 53 and 54 are concerned with the line of which B is a part and also with the substitution for the Y and X terms of the general equation the values associated with the second end point of segment A. Thus, in step 50, the value R is obtained by substracting X1 of B from X1 of A and multiplying the resultant difference by the difference obtained by substracting Y1 of B from Y2 of B. In essence, this is a substitution in the above general equation the end point coordinates of segment B for the associated coordinates in the general equation and by substituting X1 of A for X. Step 51 then determines the value of S in a manner similar to the above which is self-explanatory in FIG. 4B. Then, a decision 52 is made as to whether R=S. If the end point of A, when substituted into the equation, lies along the line, then R=S and step 52 results in a positive determination. Consequently, step 58 indicates that if intersection occurs between the segments, it is at point 1 of A.

If R does not equal S, then steps 53 and 54 determine the values of M and N by substituting the values of the coordinates of the second N point of A into the general equation of the line of segment B. In step 55, a determination is made similar to step 52 as to whether or not the values are equal. If so, this indicates that point 2 of A lies along the extended line of segment B. Therefore, step 59 provides an indication that if intersection occurs between the segments, it is at point 2 of A. If a negative decision results from step 55, then step 56 determines whether both end points are on one side of the line. This occurs if R is less than S and M is less than N. If both end points are on one side of the line, the segments cannot intersect and therefore a branch is taken to step 19. If step 56 results in a negative decision, then step 57 resolves the question of whether both end points are on the other side of the lines. If so, there is no segment intersection and a branch is taken to step 19. If step 57 results in a negative determination, the conclusion is reached at this point that segment A intersects the line of which B is a part. Step 57 results in a positive determination when R is greater than S and M is greater than N.

The next sequence of steps 60–67 are performed in a manner similar to steps 50–57 and the details which are clearly shown in FIG. 4C will not be described. The substance of these steps is that the line of which segment A is a part is defined and the end points of segment B are substituted into the general equation and comparisons are made. Steps 60 and 61 define R and S and step 62 compares the value. If they are equal, the end point lies on a resultant line and a branch is taken to step 70. Step 70 then decides whether a previous point has been indicated as a point of intersection by either steps 58 and 59. If so, then that point is taken as a point of intersection between segments A and B. If not, then step 71 indicates that intersection occurs at point 1 of segment B. In both instances, step 24 indicates that there is an intersection of the segments and the point of intersection is so indicated.

If step 62 results in a negative determination and steps 63 and 64 define M and N and step 65 then makes a comparison. If there is an equality, then step 72 determines whether steps 58 and 59 indicated a point of intersection. If so, a branch is taken to step 24 and if not, step 73 indicates intersection at point 2 of B. If M does not equal N in step 65, then step 66 compares whether the end points are on one side of the line and if they are not, then step 67 considers whether they are on the other side of the line. If steps 66 and 67 result in a positive determination, then a branch is taken to step 19. A negative determination from step 67 promises the conclusion that segment B intersects segment A. Step 74 then indicates intersection of the segments at either a determined point resulting from steps 58 and 59 or, if no such point has been indicated, at an undetermined point.

While the invention has been particularly shown and described with reference to a preferred embodiment thereof, it will be understood by those skilled in the art that the various changes in form and detail may be made therein without departing from the spirit and scope of the invention.

What is claimed is:

1. The automated method of checking whether printed circuit board line segments intersect, said method being performed by a data processing system and comprising the steps of:
   (a) defining the end points of said segments;
   (b) defining rectangles of which said segments are diagnols;
   (c) determining whether said rectangles intersect;
   (d) defining, if said rectangles intersect, a first line of which one segment is a part;
   (e) determining whether said first line and the other one of said segments intersect;
   (f) defining, if said first line and said other segment intersect, a second line of which said other segment is a part;
   (g) and determining whether said second line and said one segment intersect.

2. The method of claim 1 comprising the step of:
   (h) determining, if said segments intersect, whether such intersection is at an end point of one of said segments.

3. The method of claim 1 comprising the step of:
   (i) indicating the fact of intersection or non-intersecsection in accordance with the determinations from prior mentioned determinating steps.

4. The method of claim 1 wherein:
   each of said first and second lines are defined by a general straight line equation, and steps (e) and (g) each comprise:
   (1) substituting the end points of the segment not defined by said equation, into said equation, and
   (2) determining from the results of such substitution the positions of said end points relative to said line.

5. In a data processing system having a main storage and an arithmetic and logic unit including registers in which high speed register-to-register arithmetic and logic operations can be performed, the method performed automatically by said system of determining whether two printed circuit board straight line segments intersect, comprising the steps of:
   (a) defining in said storage the end points of said segments;

(b) loading the definitions of said end points in separate ones of said registers;
and thereafter, performing by means of register-to-register operations, the following steps:
(c) determining by use of Cartesian coordinates on a plane, whether the rectangles of which said segments form diagonals, intersect;
(d) determining, in response to a positive determination from the preceding step, whether one of said segments intersects the line of which the other of said segments is a part;
(e) and determining, as a result of a positive determination from said last step, whether said other segment intersects the line of which said first or one segment is a part.

6. The method of claim 5 comprising:

(f) indicating as a result of negative determinations from steps (c), (d) or (e) that said segments do not intersect.

7. The method of claim 5 comprising:

(g) indicating as a result of a positive determination from step (e) that said segments intersect.

References Cited

Finding the Intersection of Two Line Segments; C. J. Evangelisti, W. Muenzner, and L. E. Rittenhouse; IBM Technical Disclosure Bulletin; vol. 12, No. 6, November 1969.

MALCOLM A. MORRISON, Primary Examiner

E. J. WISE, Assistant Examiner